United States Patent
Hino et al.

(10) Patent No.: US 7,675,283 B2
(45) Date of Patent: *Mar. 9, 2010

(54) RELATIVE POSITION DETECTION DEVICE FOR MOTOR VEHICLE

(75) Inventors: Haruyoshi Hino, Shizuoka-ken (JP);
Keiko Murota, Shizuoka-ken (JP);
Hideki Shirazawa, Shizuoka-ken (JP);
Junji Terada, Shizuoka-ken (JP);
Tomohiro Ono, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/249,956

(22) Filed: Oct. 13, 2005

(65) Prior Publication Data

US 2006/0082362 A1    Apr. 20, 2006

(30) Foreign Application Priority Data

Oct. 14, 2004    (JP) .............................. 2004-299519

(51) Int. Cl.
*G01B 7/30* (2006.01)
(52) U.S. Cl. ................... 324/207.2; 123/399
(58) Field of Classification Search ................. 123/399, 123/376; 324/207.2, 207.25, 252
See application file for complete search history.

(56) References Cited

U.S. PATENT DOCUMENTS

| | | | |
|---|---|---|---|
| 4,935,698 A | 6/1990 | Kawaji et al. | |
| 5,793,200 A * | 8/1998 | Berrill | 324/207.2 |
| 6,018,241 A | 1/2000 | White et al. | |
| 6,060,881 A | 5/2000 | Dilger et al. | |
| 6,124,709 A | 9/2000 | Allwine | |
| 6,276,230 B1 | 8/2001 | Crum et al. | |
| 6,323,641 B1 | 11/2001 | Allwine | |
| 6,400,141 B1 | 6/2002 | Apel et al. | |
| 6,515,474 B1 | 2/2003 | Dielschneider et al. | |
| 6,707,292 B2 | 3/2004 | Viola | |
| 6,879,150 B2 * | 4/2005 | Sekiya | 324/207.25 |
| 6,960,973 B2 | 11/2005 | Mattson et al. | |
| 7,231,904 B2 * | 6/2007 | Hino et al. | 123/399 |
| 2003/0129886 A1 | 7/2003 | Hattori | |
| 2004/0017186 A1 | 1/2004 | Viola | |
| 2004/0065165 A1 * | 4/2004 | Sekiya et al. | 74/491 |
| 2004/0099080 A1 | 5/2004 | Hsu | |
| 2004/0216550 A1 | 11/2004 | Fallak et al. | |
| 2004/0257067 A1 | 12/2004 | Mattson et al. | |
| 2005/0127900 A1 | 6/2005 | Johnson et al. | |
| 2006/0082361 A1 | 4/2006 | Hino et al. | |
| 2006/0082362 A1 | 4/2006 | Hino et al. | |

FOREIGN PATENT DOCUMENTS

| | | |
|---|---|---|
| EP | 0 644 079 A2 | 3/1995 |
| EP | 0 871 011 A2 | 10/1998 |
| EP | 1 154 346 A1 | 11/2001 |
| EP | 1 201 485 A1 | 5/2002 |

(Continued)

*Primary Examiner*—Reena Aurora
(74) *Attorney, Agent, or Firm*—Keating & Bennett, LLP

(57) ABSTRACT

A relative position detection device is designed with multiple Hall Effect sensors. In one embodiment, the multiple Hall Effect sensors comprise two different types of Hall Effect sensors. The two different types can be linear and digital. The output of the sensors is used to determine the position an accelerator control, such as a twist grip, and to control an engine or motor in accordance with the operator demand evidenced by the position of the accelerator control.

20 Claims, 7 Drawing Sheets

FOREIGN PATENT DOCUMENTS

| | | |
|---|---|---|
| EP | 1 217 493 A1 | 6/2002 |
| EP | 1 365 128 A1 | 11/2003 |
| EP | 1 464 571 A2 | 10/2004 |
| GB | 2 235 836 A | 3/1991 |
| JP | 07-324637 | 12/1995 |
| JP | 2002-256904 | 11/2002 |

* cited by examiner

RELATIVE POSITION DETECTION DEVICE FOR MOTOR VEHICLE

CROSS-REFERENCE TO RELATED APPLICATIONS

This application claims priority to Japanese Patent Application No. 2004-299,519, which was filed on Oct. 14, 2004, which application is hereby expressly incorporated by reference in its entirety.

BACKGROUND OF THE INVENTION

1. Field of the Invention

The present invention generally relates to a relative position detection device capable of detecting a reference position of a first member and a second member that are displaceable relative to each other. More particularly, the present invention relates to a straddle-type vehicle in which a drive device, such as a motor or an engine, is controlled using the relative position detection device.

2. Description of the Related Art

In the motorcycle art, an accelerator grip is rotationally mounted on a handlebar and the accelerator is rotated with respect to the handlebar to open and close a throttle valve of the internal combustion engine. On many motorcycles, an electric relative position detection device is used, in which the rotational movement of the accelerator is detected by a potentiometer and the throttle valve is opened and closed by an actuator based upon the output voltage from the potentiometer.

To reduce the likelihood of a malfunction in the potentiometer resulting in undesired throttle positional control, a separate mechanical switch also is provided that is capable of detecting a completely-closed position of the accelerator so as to close the throttle valve if the accelerator is positioned in the closed position and the throttle valve is not fully closed.

An improved system also has been developed that features a magnetic relative position detection device in which a magnet is disposed in an accelerator and the rotational position of the accelerator is detected via changes in the magnetic flux density. In addition, a further improved system makes use of a Hall Effect sensor.

For example, in JP-A-Hei 7-324637, for the purpose of detecting the rotational position of the accelerator so as to control ignition of the internal combustion engine, a magnet is fixed to an accelerator, two digital Hall Effect sensors are secured to the handle and it is judged whether the accelerator is in the idling range, the middle-speed range or the high speed range. Nevertheless, detection of the amount of rotation of the accelerator necessary to control the opening and closing of the throttle valve still is performed using a potentiometer or the like. Moreover, because the magnet is relatively small, if the accelerator grip is rotated, the gap between the magnet and the Hall Effect sensor grows to such a degree that the magnetic flux density exerted on the Hall Effect sensor become very small. Thus, if a magnetic force is present in the vicinity of the sensor, the outside magnetic force can result in improper operation of the system.

Further, FIG. 2 of JP-A-2002-256904 disclosed a relative position detection device in which a permanent magnet is fixed to an accelerator and two Hall Effect sensor that function in the same manner as each other are fixed to a housing fastened to a handle shaft. In this case, although the details are not clear, an electric signal is output in response to the position of the permanent magnet during rotation of the accelerator using two similarly functioning Hall Effect sensors.

However, since in a relative position detection device using a conventional potentiometer, the potentiometer is larger than an accelerator, the potentiometer is more likely to degrade the aesthetics of the vehicle if the potentiometer is disposed around the accelerator. Therefore, it usually is disposed at a position other than around the accelerator and is connected to the accelerator with a conductive wire or the like, which is likely to increase the number of parts, human-hours required for assembling and the like. In addition, over time, the conductive wire is likely to elongate over time and, therefore, increases the need for maintenance.

SUMMARY OF THE INVENTION

One aspect of the present invention involves a relative position detection device comprising a first member. A second member is capable of displacement relative to the first member. The first member comprises a magnetic portion. The magnetic portion generates a magnetic field. The second member comprises a first Hall Effect sensor. The first Hall Effect sensor is positioned within the magnetic field. The first Hall Effect sensor is adapted to output a detection signal of a reference position from a flux density of the magnetic field generated by the magnetic portion. The magnetic portion comprises an S-pole section and an N-pole section that are arranged along the first member side by side in the direction of the relative displacement. The first Hall Effect sensor is configured to sense the flux density of the magnetic field at all times throughout a range in which the first member and the second member displace relative to each other.

Another aspect of the present invention involves a relative position detection device comprising a first member mounted to a handlebar assembly. The first member comprises a magnetic portion. The magnetic portion generates a magnetic field. A second member also is mounted to the handlebar assembly. The second member comprises a detecting portion. The second member comprises means for detecting relative movement between the first member and the second member and outputting a reference position signal.

BRIEF DESCRIPTION OF THE DRAWINGS

These and other features, aspects and advantages of the present invention will now be described with reference to the drawings of a preferred embodiment, which embodiment is intended to illustrate and not to limit the invention. The drawings comprise 7 figures.

FIGS. 7(a) through 7(d) are graphical representation, in which FIG. 7(a) shows a change in flux density at the position of a digital Hall Effect sensor, FIG. 7(b) shows a change of a first detection signal, FIG. 7(c) shows a change in flux density at the position of a linear Hall Effect sensor, and FIG. 7(d) shows a change of a second detection signal.

DETAILED DESCRIPTION OF THE PREFERRED EMBODIMENT

With reference now to FIG. 1 through FIG. 8, a device that is arranged and configured in accordance with certain features, aspects and advantages of the present invention is illustrated. In one configuration, the device is applied to an accelerator of a motorcycle. The device, however, can be applied to any number of other vehicles, including but not limited to go-karts, four wheel vehicles, water vehicles, scooters and the like.

The illustrated device comprises a twist grip 11, which can be used to control throttle position or the output of an associated drive member, such as an engine or an electric motor, for example but without limitation. Thus, the twist grip 11 can also be termed an accelerator.

The illustrated twist grip 11 generally defines a first member, which is mounted for rotation on a handlebar 10 near one end of the handlebar 10. A housing 12 generally defines a second member, which also can be fixed to the handlebar 10. In the illustrated configuration, the housing 12 is secured to the handlebar 10 at a position generally corresponding to a tube guide section 11a that is connected to, or forms a portion of, the twist grip 11 in the illustrated embodiment.

Figure 1:
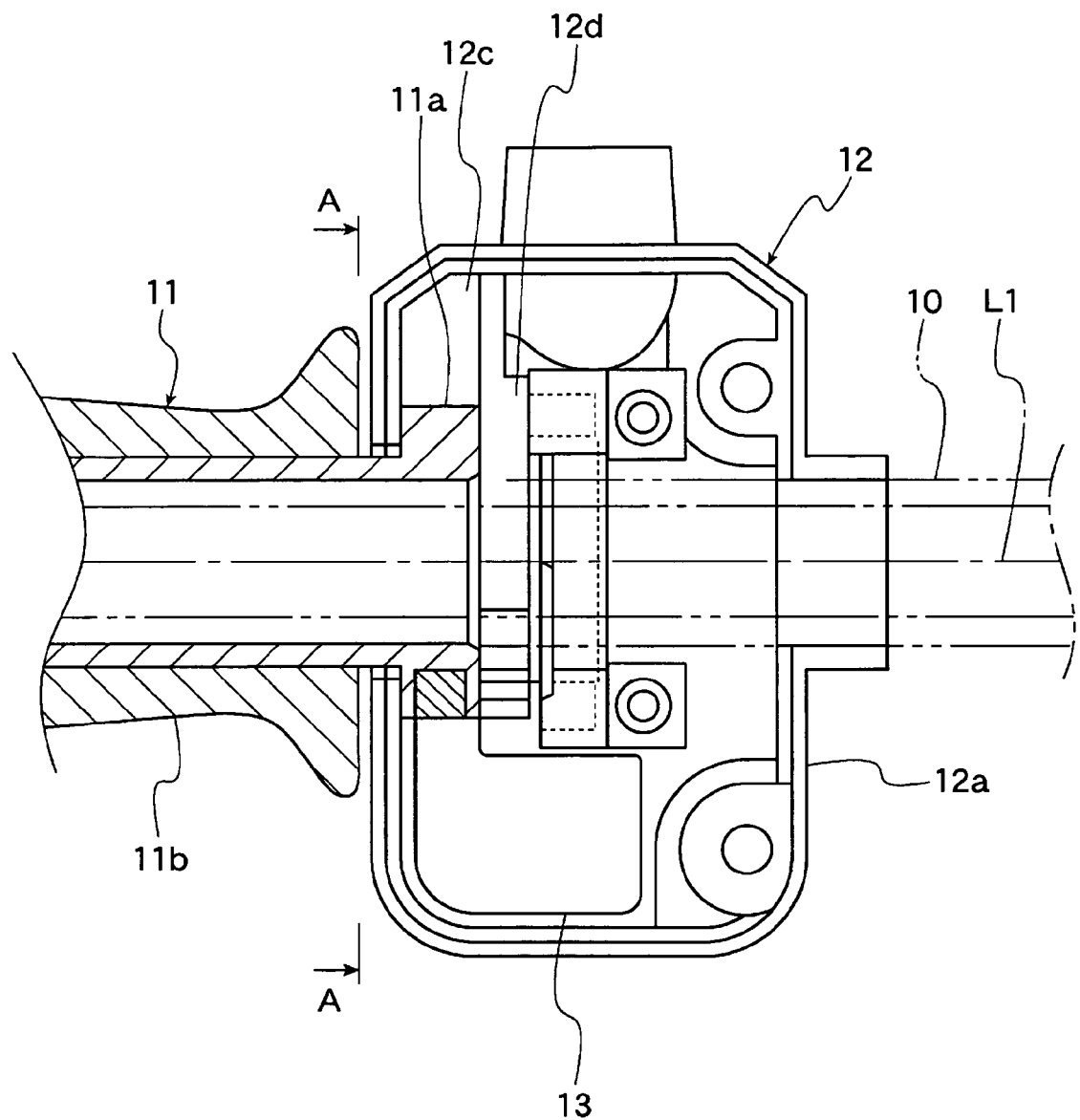
FIG. 1 is a plan view, partly in section, of an accelerator combined with a relative position detection device that is arranged and configured in accordance with certain features, aspects and advantages of the present invention.
Figure 2:
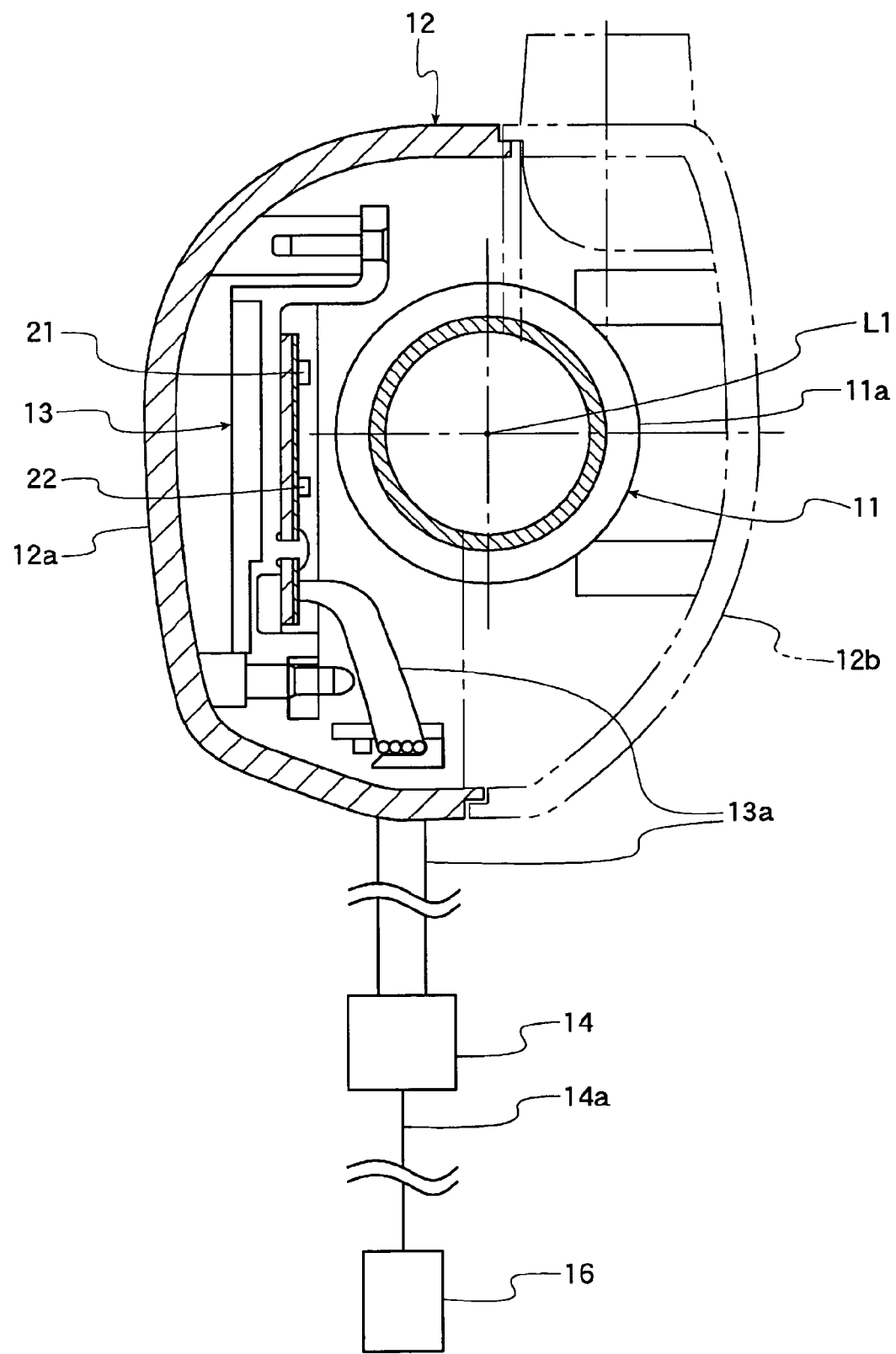
FIG. 2 is a sectional view of the device of FIG. 1, taken along line A-A.

With reference to FIG. 1 and FIG. 2, the tube guide section 11a preferably is located laterally inwardly of the balance of the accelerator 11. The tube guide section 11a of the accelerator 11 is contained in the housing 12 and is preferably mounted such that it can rotate relative to the housing 12.

With reference still to FIG. 2, a detection section 13 also is disposed inside the housing 12. In the illustrated configuration, the detection section 13 is positioned opposite the tube guide section 11a of the accelerator 11. The detection section 13 is adapted to detect movement (e.g., an opening) of the accelerator 11. Wires 13a for the detection signal extend from the detection section 13 and connect to a control section 14. The control section 14 can be mounted in any suitable location on a vehicle, such as on a body component of the vehicle, for example but without limitation. Another wire 14a preferably extends from the control section 14 to a throttle device 16 or the like. While the throttle device 16 can be in the form of a throttle body for an internal combustion engine, the throttle device also can be a control device that varies the output of an electric motor or the like. A control signal from the control section 14 can be used to manipulate the throttle device 16 such that the output of the power source (e.g., internal combustion engine, electric motor, etc.) of the vehicle can be controlled from the twist grip 11.

Figure 3:
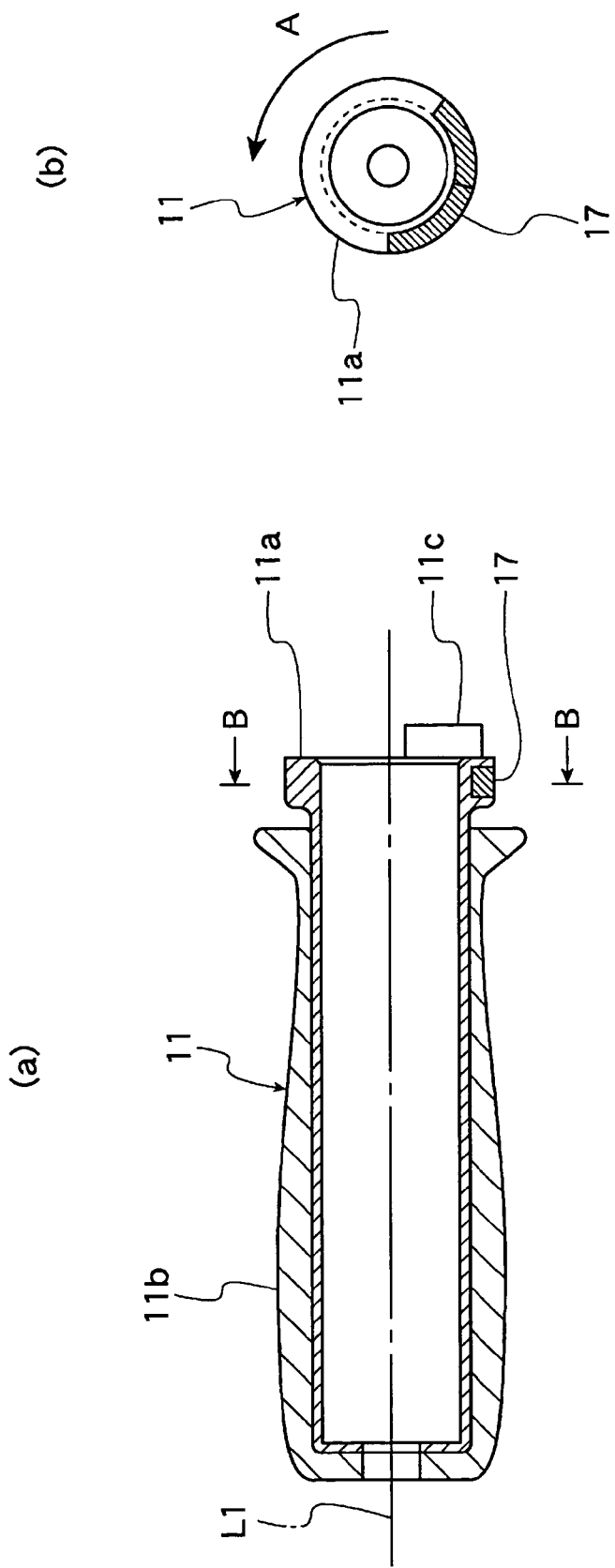
FIG. 3(a) is a longitudinal sectional view of the accelerator and FIG. 3(b) is an end view of the accelerator taken along the line B-B of FIG. 3(a).

With reference to FIG. 3, the accelerator 11 comprises the tube guide section 11a, which is disposed inside the housing 12, and a grip section 11b, which is disposed outside of the housing 12. The tube guide section 11a preferably has a rotation restriction section 11c and a magnetic member 17. The rotation restriction section 11c is designed to limit the rotational sweep of the accelerator 11 to a predetermined included angle. In one configuration, the rotation restriction section 11c is defined by boss that extends outward from an end of the tube guide section 11a. In another configuration, the rotation restriction section 11c can be a slot or other type of recess. The magnetic member 17 preferably comprises a magnetic component that is shaped in a generally arcuate shape with its center on a rotational axis L1 of the accelerator 11. The magnetic member 17 may comprise a permanent magnet or may comprise any suitable magnetizable substance. In one preferred configuration, the magnetic member 17 is embedded in the tube guide section 11a of the accelerator 11. In another configuration, the magnetic member 17 is secured to a surface of the tube guide section 11a. Other suitable configurations also can be used.

With reference to FIG. 1 and FIG. 2, the housing 12 preferably comprises a pair of split housing members 12a, 12b. The split housing members 12a, 12b encase at least a portion of the handlebar 10. In one configuration, the split housing members 12a, 12b clamp the handlebar 10 in position when secured together. The tube guide section 11a of the accelerator 11 preferably is mounted for rotation within a chamber defined by the split housing members 12a, 12b.

Figure 4:
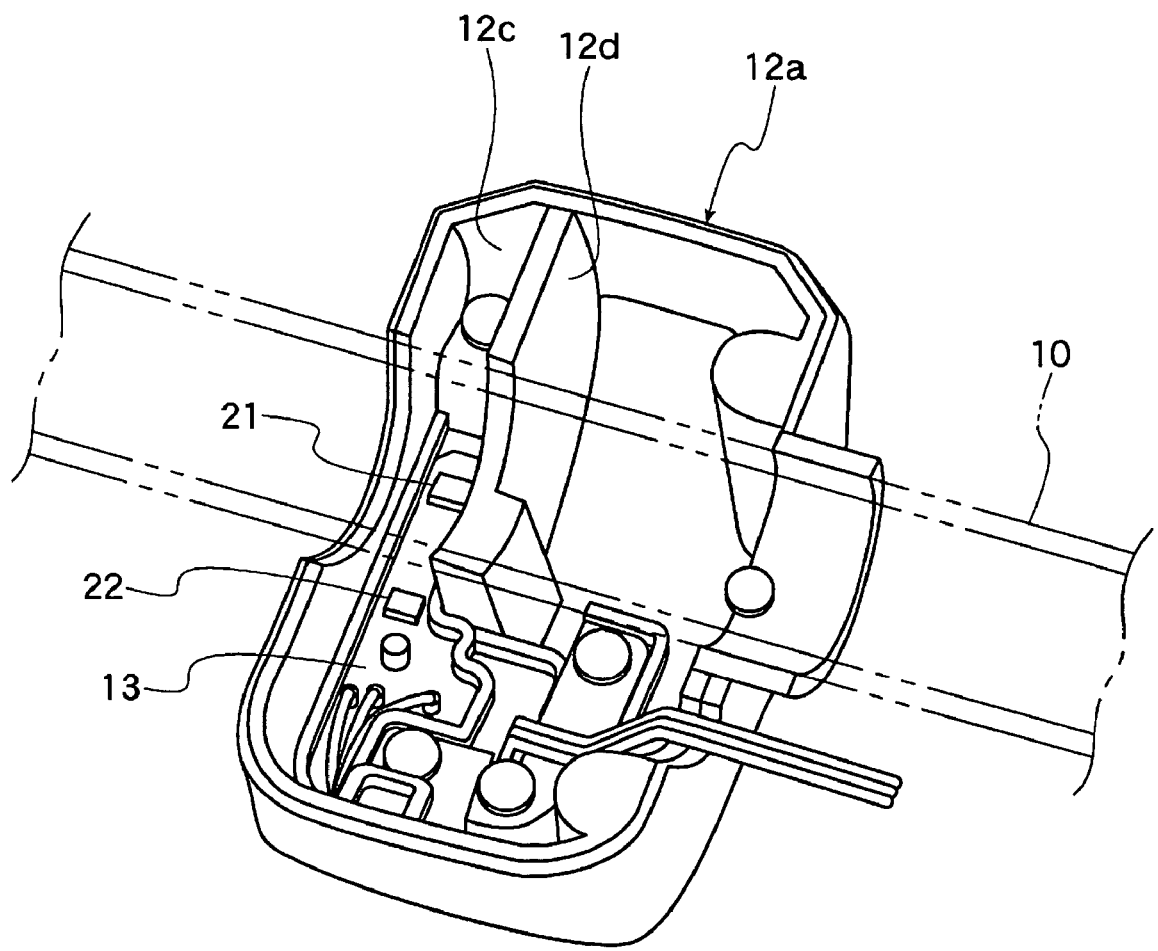
FIG. 4 is a perspective view of a split housing member of the device.

With reference to FIG. 1 and FIG. 4, a container section 12c is defined inside the split housing member 12a by one or more rib-like projection pieces 12d. In the illustrated embodiment, the container section 12c is defined by one rib-like projection piece 12d and the surrounding walls of the housing 12. The container section 12c receives the tube guide section 11a of the accelerator 11. Preferably, the projection piece 12d cooperates with the rotation restriction section 11c on the tube guide section 11a of the accelerator 11 such that the range of motion of the accelerator 11 can be limited. In other words, when the rotation restriction section 11c abuts upon the projection piece 12d, substantial continued rotational movement of the accelerator in the same direction is prevented. Thus, the rotation restriction section 11c and the projection piece 12d restrict the movement of the acceleration to a ranged defined between a completely-closed position θ0 and a fully-open position θm.

Figure 5:
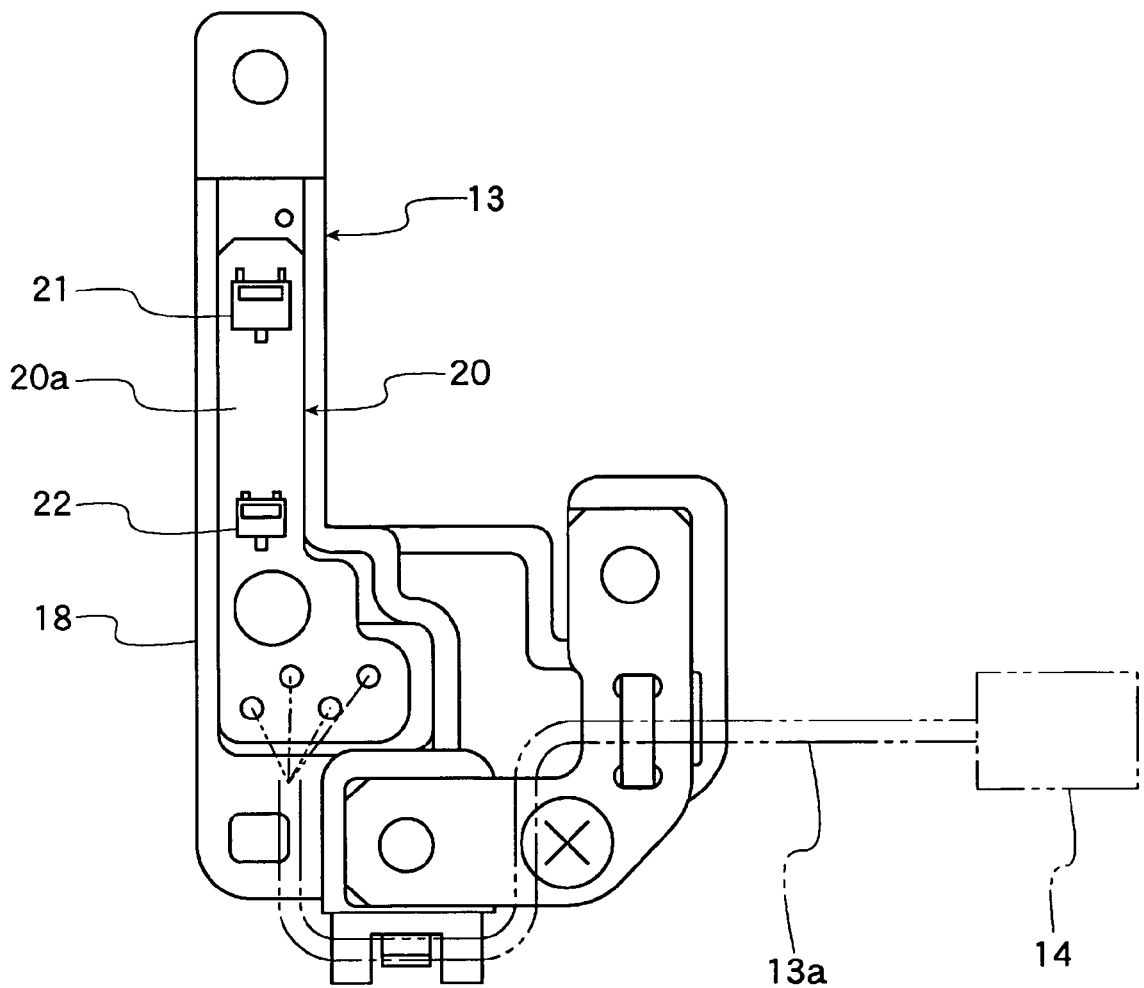
FIG. 5 is a plan view of a detection section of the device.
Figure 6:
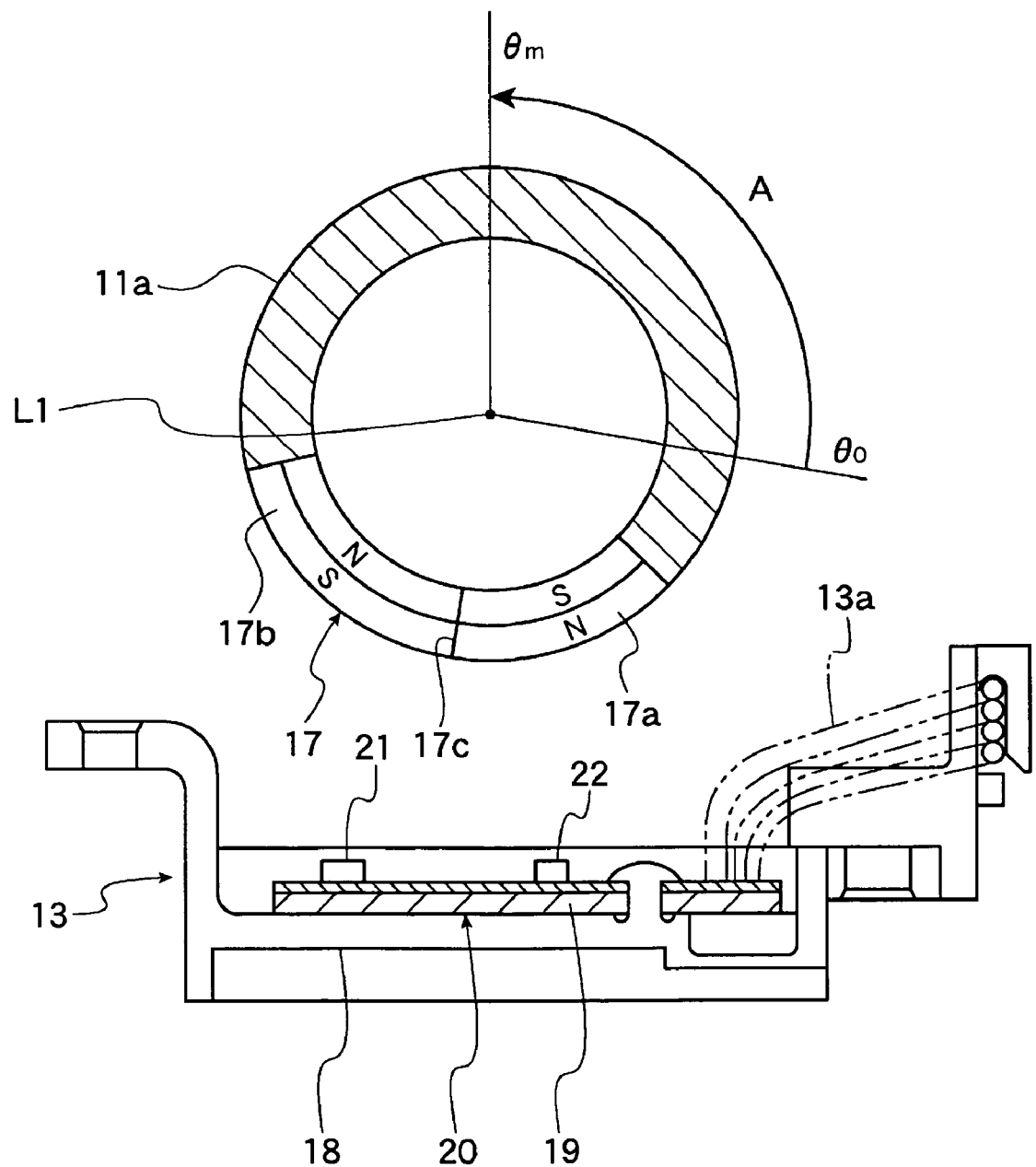
FIG. 6 is a sectional view, showing the relationship between the end portion of the accelerator and the detection section of the device.
Figure 7:
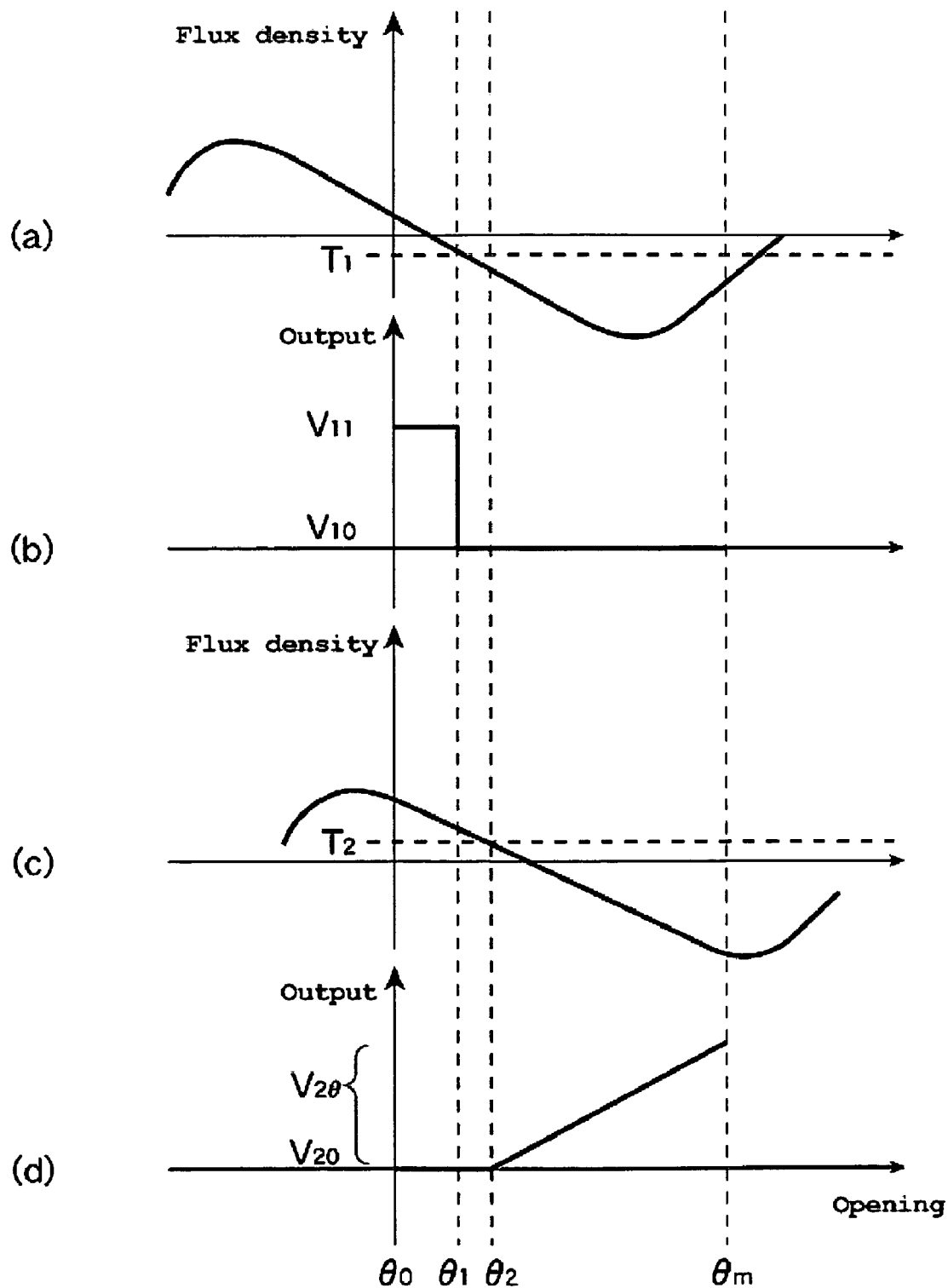

The detection section 13 preferably is mounted in and around the housing section 12c of the split housing member 12a. The detection section 13 detects the flux density of the magnetic field generated by the magnetic member 17. With reference to FIG. 5 and FIG. 6, the illustrated detection section 13 is configured such that a plate-like circuit board 20 is supported on a circuit board holder 18. The circuit board holder preferably is secured to the split housing member 12a.

The circuit board 20 comprises a magnetic metal plate 19. The plate 19 preferably is embedded in the circuit board 20. The plate 19 can be formed of any suitable material but preferably is formed of iron plate or the like. In some configurations, the circuit board itself can be made of iron or an iron plate may underlie, or be placed adjacent to, the circuit board. Since the magnetic metal plate 19, which is disposed separate from and facing the magnetic member 17, is embedded in the circuit board 20 and the digital Hall Effect sensor 21 and the linear Hall Effect sensor 22 are disposed between the metal plate 19 and the magnetic member 17, the flux of the magnetic field formed by the magnetic member 17 can be collected toward the metal plate 19 and the flux density can be more easily detected by the digital Hall Effect sensor 21 and the linear Hall Effect sensor 22 compared with when the metal plate 19 is not provided. At the same time, because the digital Hall Effect sensor 21 and the linear Hall Effect sensor 22 are disposed between the metal plate 19 and the magnetic member 17, the magnetic flux from outside of the system is greatly reduced by the metal plate 19 and is less likely to reach the digital Hall Effect sensor 11 and the linear Hall Effect sensor 12, which greatly reduces the likelihood of a malfunction or the like.

With continued reference to FIG. 5, the illustrated circuit board 20 comprises as a narrow section 20a, which is advantageously sized and configured to be positioned within the housing section 12c of the split housing member 12a, as shown in FIG. 5. A digital Hall Effect sensor 21, which defines a first Hall Effect sensor, and a linear Hall Effect sensor 22, which defines a second Hall Effect sensor, are mounted on the narrow section 20a opposite to each other in a spaced relation from the magnetic member 17. Other suitable types of sensors also can be used.

With reference to FIG. 6, the magnetic member 17 preferably is formed of two magnetic pole sections 17a, 17b that are fixed adjacent to each other in the rotating direction of the accelerator 11. The magnetic pole section 17a that is disposed forwardly in the direction "A" (i.e., the direction of movement from a completely-closed position θ0 toward a fully-open position θm of the accelerator 11) has an S-pole at the inner side and an N-pole at the outer side, while the magnetic pole section 17b which is disposed rearwardly in the direction "A", has an S-pole on the outer side and an N-pole on the inner side. Therefore, the illustrated magnetic member 17 is configured such that the N-pole and the S-pole disposed in the outer sides of the magnetic pole sections 17a, 17b in the direction "A" are disposed side by side. Advantageously, mounting the N-pole and S-pole portions of the magnetic member 17 side by side in the direction "A" results in a strong change in magnetic flux at the boundary section 17c.

The digital Hall Effect sensor 21 and the linear Hall Effect sensor 22 that are mounted on the circuit board 20 preferably are disposed in the direction perpendicular to the rotation axis L1 of the accelerator 11. In other words, the sensors 21, 22 are positioned in the rotating direction of the accelerator 11 at a suitable distance away from each other. Of these Hall Effect sensors 20, 21, the digital Hall Effect sensor 21 is disposed at a location generally corresponding to a boundary section 17c between the N-pole and the S-pole in the circumferential direction of the magnetic member 17 when the accelerator 11 is in a completely-closed state θ0. In one advantageous configuration, the accelerator 11 is provided with some mechanical play when in the position corresponding to the completely-closed state θ0. In such a configuration, the digital Hall Effect sensor 21 preferably is positioned at a location generally corresponding to the vicinity of the boundary section 17c and while being slightly more disposed toward the N-pole.

In one configuration, the digital Hall Effect sensor 21 is arranged to sense the magnetic force from the magnet member 17 only when the accelerator 11 is in a closed position. In a preferred configuration, the digital Hall Effect sensor 21 is arranged to receive the magnetic force from the magnetic member 17 throughout the range of accelerator movement. By such a placement, the digital Hall Effect sensor 21 is always influenced by the magnetic member 17 and outside magnetic field are less likely to impact performance. When the illustrated accelerator 11 is rotated, such as when it rotates from the completely-closed state θ0 to the fully-open state θm, the flux density at the position of the digital Hall Effect sensor 21 changes generally in the manner shown in FIG. 7(a) so as to decrease gradually from a position at the N-pole side in which the flux density is low and increases gradually after passing a position of an extreme density value.

Further, regarding a first detection signal from the digital Hall Effect sensor 21, a voltage V11 is output from the digital Hall Effect sensor 21 when the flux density at the corresponding position is not smaller than a given threshold T1. Thus, the digital Hall Effect sensor 21 does not change its output until the sensed flux density drops below the threshold T1. Once the sensed flux density drops below the threshold T1, a voltage V10 is output from the digital Hall Effect sensor 21. In one particularly preferred configuration, the voltage V10 is substantially zero.

The linear Hall Effect sensor 22 preferably is positioned substantially as shown in FIG. 6. In such a configuration, the linear Hall Effect sensor 22 is at a position facing the N-pole of the magnetic member 17 when the accelerator 11 is in the completely-closed state θ0. More preferably, the linear Hall Effect sensor 22 is positioned to generally face the N pole of the magnetic member 17 when the accelerator 11 is at the completely-closed position θ0 and to generally face the S pole of the magnetic member 17 when the accelerator 11 is rotated to the fully-open position θm. Even more preferably, the linear Hall Effect sensor 22 is positioned within a range of the magnetic member 17 that allows the change in the flux density to be detected in a generally linear manner such that the detected flux density changes along a sloping line similar to that shown in FIG. 6(d).

When the accelerator 11 is rotated from the completely-closed position θ0 to the fully-open position θm, the flux density sensed by the linear Hall Effect sensor varies in a generally linear manner from a position of higher flux density on the N-pole side to a position of a lower flux density, as shown in FIG. 7(c). The range of change of the flux density preferably is a range that encompasses the completely-closed state θ0 and the fully-open state θm, or is a range in which the flux density detected when the accelerator 11 is displaced from the fully-open state θm to the completely-closed state θ0 increases or decreases without passing the position of an extreme value. In the illustrated embodiment, the range of flux density encompasses the two extreme accelerator positions.

A voltage V20 preferably is output when the sensed flux density is not smaller than a given threshold T2 and a voltage V2θ that is generally inversely proportional to the flux density preferably is output when the flux density is smaller than the given threshold T2. In one preferred configuration, the voltage V20 is substantially zero.

The output voltages from the two Hall Effect sensors 21, 22 are transmitted to the control section 14. The control section 14 preferably is configured such that when the output from the digital Hall Effect sensor 21 is V11 a control signal is output by the control section 14 to the controller 16. The output control signal preferably sets a drive source, which can be an engine or an electric motor, to a low speed operating condition. The control section 14 also preferably is configured such that when the output from the digital Hall Effect sensor 21 is V10 another control signal is output by the control section 14 to the controller, which control signal generally corresponds to the output of the linear Hall Effect sensor 22. In this manner, the control section 14 enables the drive source to be operated in a manner that generally corresponds to the output of the linear Hall Effect sensor 22.

In use, the system controls the output of a drive source. Between the completely-closed position θ0 as a reference position and a given opening θ1, the flux density sensed by the illustrated digital Hall Effect sensor 21 is not smaller than the threshold value T1, as shown in FIG. 7(a). Therefore, the first detection signal V11 indicative of the completely-closed position θ0 is output from the digital Hall Effect sensor 21, as shown in FIG. 7(b). Because the sensed flux density at the position of the linear Hall Effect sensor 22 is not smaller than the threshold T2, as shown in FIG. 7(c), the second detection signal V20 corresponding to the completely-closed position θ0 is output from the linear Hall Effect sensor 22, as shown in FIG. 7(d). These output signals from the digital Hall Effect sensor 21 and the linear Hall Effect sensor 22 are communicated to the control section 14 through the wires 13a for the detection signal. Wireless configurations also are possible. A control signal to stop the power supply to the motor is transmitted to the controller 16 from the control section 14 through the wire 14a. Again, wireless configurations also are possible.

When the accelerator 11 is rotated a little in the direction "A" to cause the opening to be larger than the first opening θ1, the sensed flux density at the digital Hall Effect sensor 21 becomes larger than the given threshold T1 and the first detection signal V10 is output. Simultaneously, in the illustrated embodiment, the sensed flux density at the linear Hall Effect sensor 22 is larger than the given threshold T2 and so the second detection signal V20 continues to be output from the linear Hall Effect sensor 22. Therefore, the control signal discussed above, which directs the controller 16 to stop output from the motor, continues to be supplied by the control section 14.

When the accelerator 11 is rotated further in the direction "A" and the opening becomes larger than the second opening θ2, the sensed flux density at the linear Hall Effect sensor 22 becomes smaller than T2 while the first detection signal V10 continues to be output from the digital Hall Effect sensor 21. The drop in the sensed flux density at the linear Hall Effect sensor 22 causes the linear Hall Effect sensor to output a second detection signal V2θ, which generally corresponds to a change in sensed flux density. The output of the second detection signal V2θ is transmitted to the control section 14. In the illustrated configuration, the signal is transmitted through the wires 13a but a wireless configuration can be used. Therefore, a control signal corresponding to the second detection signal V2θ is output through the control section 14 to the controller 16 and the drive source is controlled to generally correspond to the second detection signal V2θ.

When the accelerator 11 is set to a full-open position θm, the sensed flux density at the digital Hall Effect sensor 21 is smaller than the given threshold T1 and, therefore, the output continues to be V10. In addition, the drive source is set to a fully-open position that corresponds to the fully-opened position θm of the accelerator, which corresponds to the output signal V2θ from the linear Hall Effect sensor 22. When the accelerator 11 is rotated back towards the closed position (i.e., in a direction opposite to the direction "A") but remains in a position greater than the opening θ2, the power source is operated to correspond to the second detection signal V2θ from the linear Hall Effect sensor 22. Once the opening of the accelerator decreases below θ2, the power source is effectively stopped or returned to an idle position.

When used on a vehicle, such as a motorcycle, the illustrated device described above can be used to control engine speed. For instance, when the digital Hall Effect sensor 21 outputs the first detection signal V11, which is indicative of the accelerator 11 being in the completely-closed position θ0, the control section 14 can output a control signal corresponding to the completely-closed position. When the digital Hall Effect sensor 21 outputs the first detection signal V10, which is indicative of the accelerator 11 opening more than a preset angle, the control section 14 can output a control signal corresponding to the second detection signal V2θ that is output from the linear Hall Effect sensor 22.

When the accelerator 11 is completely-closed (i.e., in the completely-closed position θ0) with respect to the housing 12, if the digital Hall Effect sensor 21 erroneously outputs the first detection signal V10, which indicates an opened accelerator position, instead of the first detection signal V11, which indicates a completely-closed accelerator position θ0, as a result of malfunction or the like, the second detection signal V20 indicative of the completely-closed position θ0 is output from the linear Hall Effect sensor 22. Thus, the control section 14 can output a control signal corresponding to the completely-closed state regardless of the signal received from the digital Hall Effect sensor 21. When the linear Hall Effect sensor 22 outputs the second detection signal V2θ, which indicates that the accelerator 11 is opened more than a preset angle, as a result of malfunction or the like, a first detection signal V11 indicative of the completely-closed position θ0 is simultaneously output from the digital Hall Effect sensor 21 so that a control signal corresponding to the completely-closed state is output from the control section 14. Thus, the illustrated system has a built-in redundancy that allows the control section 14 to stop the engine regardless of one of the sensors 21, 22 failing. Accordingly, in the event of a sensor malfunction, no control signal based on the malfunction or the like is output to the controller 16, which greatly reduces the likelihood of the power source being controlled in an erroneous manner. In other words, if the first and the second member are disposed at the reference position and if no first detection signal indicative of the reference position is output from the first Hall Effect sensor as a result of a malfunction or the like, or even if the second detection signal corresponding to the position of relative displacement is output from the second Hall Effect sensor as a result of a malfunction or the like, a control signal corresponding to the reference position is output from the control section, so that no control signal based on a malfunction or the like is output to the controlled object, thereby greatly reducing the likelihood of a controlled object malfunction.

Through the use of the Magnetic member 17, which coupled for rotation with the accelerator, together with the two Hall sensors 21, 22, which are mounted in a non-contact relationship with the magnetic member 17, and the control section 14, output from rotation of the accelerator can be used to control a throttle mechanism, an electric motor or the like. Moreover, the illustrated configuration can replace a potentiometer or the like that is used in convention systems. Thus, a relatively low cost replacement can be made for a potentiometer-based unit.

Further, compared with a potentiometer-based system, no member such as a potentiometer having a shape larger than that of the accelerator 11 is required and the wires or the like for connecting the accelerator 11 and the potentiometer are unnecessary, which improves the aesthetics of the assembly. Moreover, the number of parts and human-hours for assembling the parts can be reduced because of the lack of large numbers of mechanical parts. Furthermore, the constructions disclosed herein are less likely to deteriorate over time.

Although in the foregoing embodiment, the digital Hall Effect sensor 21 detects the flux density below a threshold at the opening θ1 of the accelerator 11, and after the condition is reached in which no detection signal is output, the accelerator is rotated further to output the detection signal from the linear Hall Effect sensor 22 after the opening reaches θ2, other configurations can be arranged such that the detection signal of the linear Hall Effect sensor 22 is output after the accelerator 11 reaches a position of the opening θ1 at which subsequent output of the detection signal from the linear Hall Effect sensor 22 is stopped. Also, the device can be arranged such that the detection signal of the linear Hall Effect sensor 22 is output at a position where the accelerator 11 reaches an opening smaller than the opening θ1. In this case, control is performed such that the detection value from the linear Hall Effect sensor 22 is offset-operated at the position of the opening θ1.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A relative position detection device comprising a first member, a second member being capable of displacement in a relative displacement direction relative to the first member, the first member comprising a magnetic portion, the magnetic portion generating a magnetic field, the second member comprising a first Hall Effect sensor, the first Hall Effect sensor being positioned within the magnetic field without any intervening magnetic material positioned directly between the first Hall Effect sensor and the magnetic portion of the first member, the first Hall Effect sensor adapted to output a detection signal from a flux density of the magnetic field generated by the magnetic portion, the magnetic portion comprising an S-pole section and an N-pole section that are arranged along the first member side by side in the relative displacement direction, and the first Hall Effect sensor being configured to sense the flux density of the magnetic field at all times throughout a full range in which the first member and the second member displace relative to each other, the detection device further comprising a second Hall effect sensor configured to detect movement of the first member.

2. The device of claim 1 in combination with a handlebar, one of the magnetic portion and the first Hall Effect sensor being fixed to the handlebar and the other to an accelerator grip mounted to the handlebar for rotation relative to the handlebar, the relative position detection device being mounted in such a manner that a completely-closed position of the accelerator grip is defined as the reference position.

3. The device of claim 1, wherein the first Hall Effect sensor is a digital Hall Effect sensor.

4. The device of claim 3 further comprising a magnetic metal plate and the first Hall Effect sensor being disposed between the metal plate and the magnetic portion.

5. The device of claim 4 in combination with a handlebar, one of the magnetic portion and the first Hall Effect sensor being fixed to the handlebar and the other to an accelerator grip mounted to the handlebar for rotation relative to the handlebar, the relative position detection device being mounted in such a manner that a completely-closed position of the accelerator grip is defined as the reference position.

6. The device of claim 3 in combination with a handlebar, one of the magnetic portion and the first Hall Effect sensor being fixed to the handlebar and the other to an accelerator grip mounted to the handlebar for rotation relative to the handlebar, the relative position detection device being mounted in such a manner that a completely-closed position of the accelerator grip is defined as the reference position.

7. The device of claim 1, wherein the second member comprises the second Hall Effect sensor, the second Hall Effect sensor being adapted to detect a change of the flux density of the magnetic field generated by the magnetic portion, and wherein the second Hall Effect sensor is located in a range within which the flux density of the magnetic field of the magnetic portion changes in a generally linear manner.

8. The device of claim 7 in combination with a handlebar, one of the magnetic portion and the first Hall Effect sensor being fixed to the handlebar and the other to an accelerator grip mounted to the handlebar for rotation relative to the handlebar, the relative position detection device being mounted in such a manner that a completely-closed position of the accelerator grip is defined as the reference position.

9. The device of claim 7 further comprising a magnetic metal plate and the first Hall Effect sensor being disposed between the metal plate and the magnetic portion.

10. The device of claim 9 in combination with a handlebar, one of the magnetic portion and the first Hall Effect sensor being fixed to the handlebar and the other to an accelerator grip mounted to the handlebar for rotation relative to the handlebar, the relative position detection device being mounted in such a manner that a completely-closed position of the accelerator grip is defined as the reference position.

11. The device of claim 1 further comprising a magnetic metal plate and the first Hall Effect sensor being disposed between the metal plate and the magnetic portion.

12. The device of claim 11 in combination with a handlebar, one of the magnetic portion and the first Hall Effect sensor being fixed to the handlebar and the other to an accelerator grip mounted to the handlebar for rotation relative to the handlebar, the relative position detection device being mounted in such a manner that a completely-closed position of the accelerator grip is defined as the reference position.

13. The device of claim 1, wherein the second Hall effect sensor is a linear Hall effect sensor.

14. The device of claim 13, wherein the first Hall effect sensor is a digital Hall effect sensor.

15. A relative position detection device comprising a first member, a second member being capable of displacement relative to the first member in a relative displacement direction, the first member comprising a magnetic portion, the magnetic portion generating a magnetic field, the second member comprising a first Hall Effect sensor, the first Hall Effect sensor being positioned within the magnetic field without any intervening magnetic material positioned directly between the first Hall Effect sensor and the magnetic portion of the first member, the first Hall Effect sensor adapted to output a detection signal of a reference position from a flux density of the magnetic field generated by the magnetic portion, the magnetic portion comprising an S-pole section and an N-pole section that are arranged along the first member side by side in the relative displacement direction, and the first Hall Effect sensor being configured to sense the flux density of the magnetic field at all times throughout a full range in which the first member and the second member displace relative to each other, wherein the first Hall Effect sensor is a digital Hall Effect sensor, and wherein the second member further comprises a second Hall Effect sensor that is adapted to detecting a change of the flux density of the magnetic field generated by the magnetic portion, and the second Hall Effect sensor is located in a range within which the flux density of the magnetic field of the magnetic portion changes in a generally linear manner.

16. The device of claim 15 in combination with a handlebar, one of the magnetic portion and the first Hall Effect sensor being fixed to the handlebar and the other to an accelerator grip mounted to the handlebar for rotation relative to the handlebar, the relative position detection device being mounted in such a manner that a completely-closed position of the accelerator grip is defined as the reference position.

17. The device of claim 16 further comprising a magnetic metal plate and the first Hall Effect sensor being disposed between the metal plate and the magnetic portion.

18. The device of claim 17 in combination with a handlebar, one of the magnetic portion and the first Hall Effect sensor being fixed to the handlebar and the other to an accelerator grip mounted to the handlebar for rotation relative to the handlebar, the relative position detection device being mounted in such a manner that a completely-closed position of the accelerator grip is defined as the reference position.

19. A relative position detection device comprising a first member mounted to a handlebar assembly, the first member comprising at least a first magnetic portion, the first magnetic portion generating a magnetic field, the first magnetic portion comprising an S-pole section and an N-pole section that are arranged along the first member side by side in a relative displacement direction between the first member and the second member, a second member also mounted to the handlebar assembly, the second member comprising a detecting portion positioned such that there is no intervening magnetic material positioned directly between the detecting portion of the second member and the first magnetic portion of the first member, the second member comprising first means for detecting relative movement between the first member and the second member and outputting a reference position signal, the second member further comprising second means for detecting relative movement between the first member and the second member and outputting a signal that changes throughout a range of movement of the first member relative to the second member.

20. The device of claim 19, wherein the first means is positioned so as to remain within a detectable portion of the magnetic field throughout a range of motion of the first member relative to the second member.

* * * * *